US012435840B2

(12) United States Patent
Lai et al.

(10) Patent No.: US 12,435,840 B2
(45) Date of Patent: Oct. 7, 2025

(54) PRESSURE VESSEL CAPABLE OF RELEASING PRESSURE (71) Applicant: ZHEJIANG DONGCHENG PRINTING CO., LTD., Quzhou (CN)

(72) Inventors: Xianji Lai, Quzhou (CN); Yizhong Chen, Quzhou (CN)

(73) Assignee: ZHEJIANG DONGCHENG PRINTING CO., LTD., Quzhou (CN)

( * ) Notice: Subject to any disclaimer, the term of this patent is extended or adjusted under 35 U.S.C. 154(b) by 88 days.

(21) Appl. No.: 18/510,675

(22) Filed: Nov. 16, 2023

(65) Prior Publication Data

US 2024/0401752 A1 Dec. 5, 2024

Related U.S. Application Data (63) Continuation of application No. PCT/CN2023/104404, filed on Jun. 30, 2023.

(30) Foreign Application Priority Data

Jun. 2, 2023 (CN) .......................... 202310648358.4

(51) Int. Cl.
*F17C 13/12* (2006.01)
(52) U.S. Cl.
CPC ...... *F17C 13/12* (2013.01); *F17C 2201/0109* (2013.01); *F17C 2201/0114* (2013.01); *F17C 2260/042* (2013.01)
(58) Field of Classification Search
CPC .............. F17C 13/12; F17C 2201/0109; F17C 2201/0114; F17C 2260/042;
(Continued)

(56) References Cited

U.S. PATENT DOCUMENTS

2006/0043122 A1* 3/2006 Ferreira ................. B65D 83/70
  222/397
2015/0151900 A1* 6/2015 Henry .................... B65D 83/70
  222/397

FOREIGN PATENT DOCUMENTS

CN         103697320 A  *  4/2014
WO   WO-2021189934 A1  *  9/2021 ............. B65D 83/38

OTHER PUBLICATIONS

English Machine Translation of CN-103697320-A (Year: 2014).*
English Machine Translation of WO-2021189934-A1 (Year: 2021).*

* cited by examiner

*Primary Examiner* — Don M Anderson
*Assistant Examiner* — Laura E. Parker (57) ABSTRACT Disclosed is a pressure vessel capable of releasing pressure, relating to the technical field of pressure vessels. The pressure vessel includes a dome portion, a side wall portion, and a concave bottom in seaming connection with a bottom of the side wall portion; a pressure release port is provided at a top of the dome portion; a lower edge of the side wall portion is tightly attached to an outer edge of the concave bottom, and the both are curled outward and hermetically connected; the concave bottom includes a circular bottom surface and an inclined connecting surface, and a pressure relief notch groove is provided on an outer side of the circular bottom surface; dimensions of the dome portion, side wall portion, circular bottom surface, inclined connecting surface, and pressure relief notch groove satisfy specific proportional relationships, making the pressure vessel with limited dimensional values have better safety.

12 Claims, 6 Drawing Sheets (58) Field of Classification Search
CPC ....... F17C 2203/069; F17C 2270/0718; B65D 83/70; B65D 51/1638; B65D 83/38; B05B 15/14; Y10T 137/1744
USPC .............................................. 220/89.1, 89.2
See application file for complete search history.

PRESSURE VESSEL CAPABLE OF RELEASING PRESSURE

FIELD OF THE INVENTION

The present invention relates to the technical field of pressure vessels, and in particular, to a pressure vessel capable of releasing pressure.

BACKGROUND OF THE INVENTION

Pressure vessels are used for packaging and distributing various fluid products, such as liquids, gases, solids, and mixtures thereof. Under normal operating conditions, such containers can fully meet people's requirements. However, containers subjected to excessive pressure due to improper use, heating, or other reasons may rupture violently. Various aerosol cans emerge on the market now to prevent explosions under pressure.

Among these pressure relief devices, one type of pressure relief device has one or more concave areas at the bottom, combined with a pressure relief notch groove with reduced material thickness to provide determined relief pressure. However, a low precision pressing depth may lead to high pressure release, and a high precision pressing depth may lead to premature low pressure release, so that the remaining thin metal sheet at the bottom of the pressure relief notch groove has micro cracks. Therefore, before mass production of products, special attention must be paid to frequent sampling and testing, which requires a high technical level and greatly increases manufacturing costs. Therefore, those skilled in the art urgently need to find a novel technical solution to solve the above problems.

SUMMARY OF THE INVENTION

In response to the technical problems in the prior art, the present invention provides a pressure vessel capable of releasing pressure.

The present invention discloses a pressure vessel capable of releasing pressure. The pressure vessel includes a dome portion and a side wall portion connected into a whole from top to bottom, and a concave bottom in seaming connection with a bottom of the side wall portion, where a pressure release port is provided at a top of the dome portion; the side wall portion is cylindrical; a lower edge of the side wall portion is tightly attached to an outer edge of the concave bottom, and the both are curled outward and hermetically connected; the concave bottom includes a circular bottom surface in the center and an inclined connecting surface, and a pressure relief notch groove is provided on an outer side of the circular bottom surface;

Dimensions of the pressure vessel satisfy:

$$k1 = [2, 5],$$
$$k2 = [2, 4],$$
$$k3 = [0.5, 0.75],$$
$$k4 = [4, 20];$$
$$k1 = \frac{a1 + a2}{a5};$$
$$k2 = \frac{a4}{a3};$$
$$k3 = \frac{a7}{a3};$$
$$k4 = \frac{(a1 + a2) * a5}{(a3 + a4) * a6};$$

The dome portion has a height of a1, and a value range of a1 is [5 mm, 40 mm];

The side wall portion has a height of a2, and a value range of a2 is [50 mm, 300 mm];

The circular bottom surface has a diameter of a3, and a value range of a3 is [3 mm, 60 mm];

The inclined connecting surface has a maximum diameter of a4, and a value range of a4 is [30 mm, 125 mm];

The side wall portion has a diameter of a5, and a value range of a5 is [35 mm, 130 mm];

A distance between the circular bottom surface and a bottommost surface of the pressure vessel is a6, and a value range of a6 is [2 mm, 30 mm];

The pressure relief notch groove has a length of a7, and a value range of a7 is [1.5 mm, 45 mm];

The side wall portion has a thickness of b1, and a value range of b1 is [0.18 mm, 0.38 mm];

The concave bottom has a thickness of b2, and a value range of b2 is [0.3 mm, 0.8 mm].

Further, the pressure relief notch groove is a straight groove, an arc groove, an X-shaped groove, or a V-shaped groove.

Further, an angle range of a corresponding central angle θ for the arc groove is θ=[10°, 180°], and a value range of a corresponding radius R for the arc groove is R=[0.5 mm, 5 mm].

Further, a cross section of the pressure relief notch groove has a shape of an isosceles trapezoid, and a width of the pressure relief notch groove gradually decreases from an opening to a bottom.

Further, the cross section of the pressure relief notch groove is hook-shaped or U-shaped.

Further, the dimensions of the pressure vessel satisfy:

$$\frac{b4}{b3 + b4} = \frac{b6}{a8};$$

The pressure relief notch groove has a depth of b3, and a value range of b3 is [0.25 mm, 0.75 mm];

The circular bottom surface at the pressure relief notch groove has a thickness of b4, and a value range of b4 is [0.05 mm, 0.4 mm];

The opening of the pressure relief notch groove has a width of a8, and a value range of a8 is [0.1 mm, 3 mm];

The bottom of the pressure relief notch groove has a width of b6, and a value range of b6 is [0.1 mm, 1 mm].

Further, the dimensions of the pressure vessel satisfy:

$$k5 = [2, 5],$$
and
$$k5 = \frac{a8}{b3};$$

The pressure relief notch groove has a depth of b3, and a value range of b3 is [0.25 mm, 0.75 mm];

The opening of the pressure relief notch groove has a width of a8, and a value range of a8 is [0.1 mm, 5 mm].

Further, the depth of the arc groove gradually increases from two ends to a midpoint, the two ends of the arc groove have a depth of b5, and a value range of b5 is [0.1 mm, 0.45 mm].

Further, the depth of the arc groove from two ends to a midpoint is consistent, and the value range of b3 is [0.3 mm, 0.6 mm].

Further, the dimensions of the pressure vessel satisfy:

$$k6 = [2, 30],$$

and $$k6 = \frac{a1 + a2}{a6}.$$

The pressure vessel capable of releasing pressure in the present invention includes a dome portion and a side wall portion connected into a whole from top to bottom, and a concave bottom in seaming connection with a bottom of the side wall portion, where a pressure release port is provided at a top of the dome portion; the side wall portion is cylindrical; a lower edge of the side wall portion is tightly attached to an outer edge of the concave bottom, and the both are curled outward and hermetically connected; the concave bottom includes a circular bottom surface in the center and an inclined connecting surface, and a pressure relief notch groove is provided on an outer side of the circular bottom surface; dimensions of the dome portion, the side wall portion, the circular bottom surface, the inclined connecting surface, and the pressure relief notch groove satisfy specific proportional relationships, so that the pressure vessel obtained by selecting dimensional values of all portions within limited ranges can have better safety; and those skilled in the art can directly select the dimensional values of the pressure vessel according to the limitations of the present invention, without excessive sampling and testing, thereby greatly reducing product experiment costs.

BRIEF DESCRIPTION OF THE DRAWINGS

In order to describe the technical solution in embodiments of the present invention or the prior art more clearly, the drawings which need to be used in the description of the embodiments or the prior art will be simply introduced below. Obviously, the accompanying drawings in the following description show merely some embodiments of the present invention, and those of ordinary skill in the art may still derive other drawings according to these drawings without any creative efforts.

In the figures, 10—dome portion, 101—pressure release port, 20—side wall portion, 30—concave bottom, 301—circular bottom surface, 302—inclined connecting surface, and 303—pressure relief notch groove.

DETAILED DESCRIPTION OF THE EMBODIMENTS

The technical solutions in the embodiments of the present invention will be clearly and completely described below with reference to the accompanying drawings in the present invention. Apparently, the described embodiments are only some, not all of the embodiments of the present invention. All other embodiments obtained by those of ordinary skill in the art based on the embodiments of the present invention without any creative effort shall fall within the scope of protection of the present invention.

Figure 1:
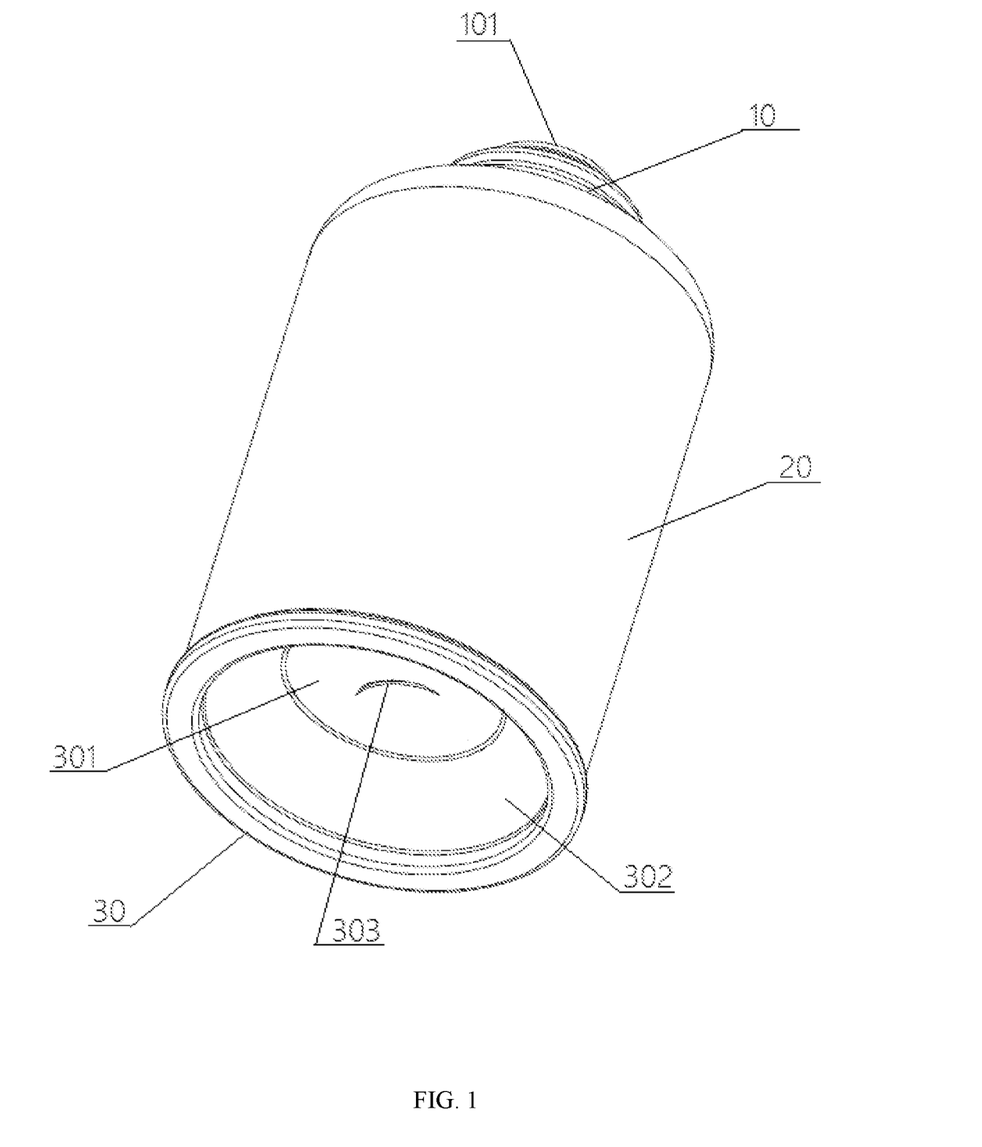
FIG. 1 is a schematic structural diagram of a pressure vessel capable of releasing pressure according to an embodiment of the present invention.

A pressure vessel capable of releasing pressure according to an embodiment of the present invention, as shown in FIG. 1, includes a dome portion 10 and a side wall portion 20 connected into a whole from top to bottom, and a concave bottom 30 in seaming connection with a bottom of the side wall portion 20, where a pressure release port 101 is provided at a top of the dome portion 10; the side wall portion 20 is cylindrical; a lower edge of the side wall portion 20 is tightly attached to an outer edge of the concave bottom 30, and the both are curled outward and hermetically connected; and the concave bottom 30 includes a circular bottom surface 301 in the center and an inclined connecting surface 302, and a pressure relief notch groove 303 is provided on an outer side of the circular bottom surface 301.

Dimensions of the pressure vessel in the embodiment of the present invention satisfy:

$$k1 = [2, 5],$$
$$k2 = [2, 4],$$
$$k3 = [0.5, 0.75],$$
$$k4 = [4, 20];$$
$$k1 = \frac{a1 + a2}{a5};$$
$$k2 = \frac{a4}{a3};$$
$$k3 = \frac{a7}{a3};$$
$$k4 = \frac{(a1 + a2) * a5}{(a3 + a4) * a6};$$

Figure 2:
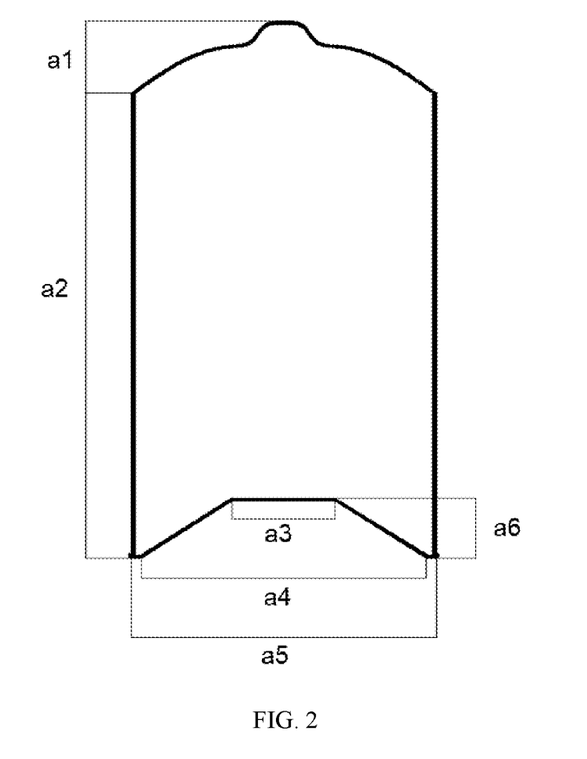
FIG. 2 is a dimensional annotation diagram of the pressure vessel capable of releasing pressure according to an embodiment of the present invention.
Figure 3:
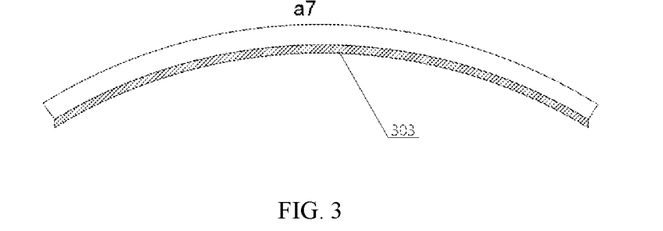
FIG. 3 is a dimensional annotation diagram of a pressure relief notch groove in the pressure vessel capable of releasing pressure according to an embodiment of the present invention.

As shown in FIG. 2 and FIG. 3,

The dome portion 10 has a height of a1, and a value range of a1 is [5 mm, 40 mm];

The side wall portion 20 has a height of a2, and a value range of a2 is [50 mm, 300 mm];

The circular bottom surface 301 has a diameter of a3, and a value range of a3 is [3 mm, 60 mm];

The inclined connecting surface 302 has a maximum diameter of a4, and a value range of a4 is [30 mm, 125 mm];

The side wall portion 20 has a diameter of a5, and a value range of a5 is [35 mm, 130 mm];

A distance between the circular bottom surface 301 and a bottommost surface of the pressure vessel is a6, and a value range of a6 is [2 mm, 30 mm];

The pressure relief notch groove 303 has a length of a7, and a value range of a7 is [1.5 mm, 45 mm]. If the length of the pressure relief notch groove is closer to the diameter a3 of the circular bottom surface, the pressure bearing capacity of the pressure vessel is lower.

In addition, the side wall portion 20 of the pressure vessel in the embodiment of the present invention has a thickness of b1, and a value range of b1 is [0.18 mm, 0.38 mm]; and the concave bottom 30 has a thickness of b2, and a value range of b2 is [0.3 mm, 0.8 mm]. The thickness b2 of the concave bottom 30 can be selected according to situations. For example, when the pressure vessel stores a corrosive gas, the thickness of the concave bottom can be increased to prevent the corrosive gas from corroding the concave bottom to become too thin, thereby ensuring product safety.

The dimensions of the pressure vessel in the embodiment of the present invention have at least four proportional relationships: k1 indicates a dimensional relationship between a total height of the pressure vessel and a maximum diameter of the pressure vessel, k2 indicates a dimensional relationship between a diameter of the concave bottom 30 and the diameter of the circular bottom surface 301, k3 indicates a dimensional relationship between the length of the pressure relief notch groove 302 and the circular bottom surface 301, and k4 can reflect a dimensional relationship between an internal area of the pressure vessel and a concave degree of the concave bottom 30 under a longitudinal section of the pressure vessel. After the above dimensional relationships are limited, those skilled in the art can select dimensional values of all portions within limited ranges to obtain a pressure vessel that can have better safety, without excessive sampling and testing, thereby greatly reducing product experiment costs. In addition, those skilled in the art can also directly use subsequent parameter value examples of the present invention as dimensional parameters of corresponding pressure vessels.

Figure 4:
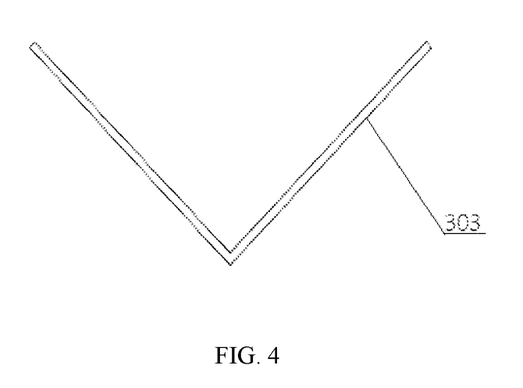
FIG. 4 is a schematic shape diagram (1) of the pressure relief notch groove in the pressure vessel capable of releasing pressure according to an embodiment of the present invention.
Figure 5:
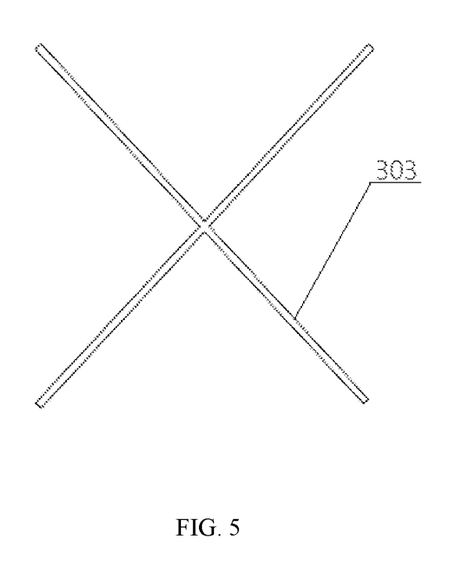
FIG. 5 is a schematic shape diagram (2) of the pressure relief notch groove in the pressure vessel capable of releasing pressure according to an embodiment of the present invention.
Figure 6:
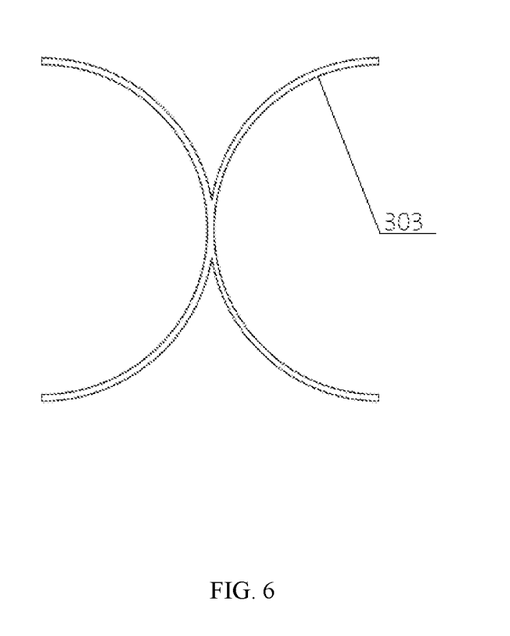
FIG. 6 is a schematic shape diagram (3) of the pressure relief notch groove in the pressure vessel capable of releasing pressure according to an embodiment of the present invention.

Specifically, the pressure relief notch groove 303 in the embodiment of the present invention is a straight groove, an arc groove, an X-shaped groove, or a V-shaped groove. The pressure relief notch groove is a V-shaped groove as shown in FIG. 4 and an X-shaped groove as shown in FIG. 5 and FIG. 6.

Specifically, when the pressure relief notch groove 303 is an arc groove, an angle range of a corresponding central angle θ for the arc groove is θ=[10°, 180°], and a value range of a corresponding radius R for the arc groove is R=[0.5 mm, 5 mm].

Figure 7:
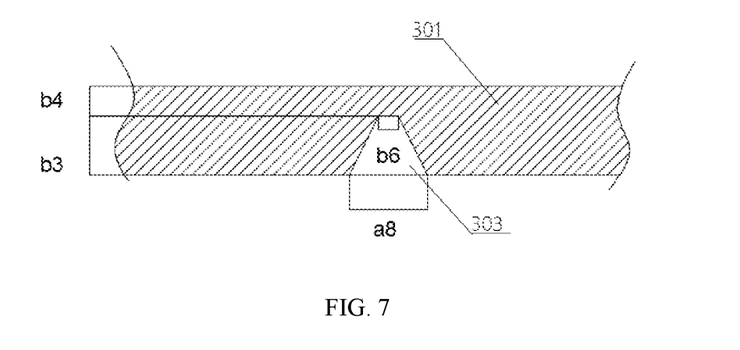
FIG. 7 is a partial cross-sectional diagram (1) of a circular bottom surface in the pressure vessel capable of releasing pressure according to an embodiment of the present invention.

As shown in FIG. 7, a cross section of the pressure relief notch groove 303 in the embodiment of the present invention has a shape of an isosceles trapezoid, and a width of the pressure relief notch groove 303 gradually decreases from an opening to a bottom.

Figure 8:
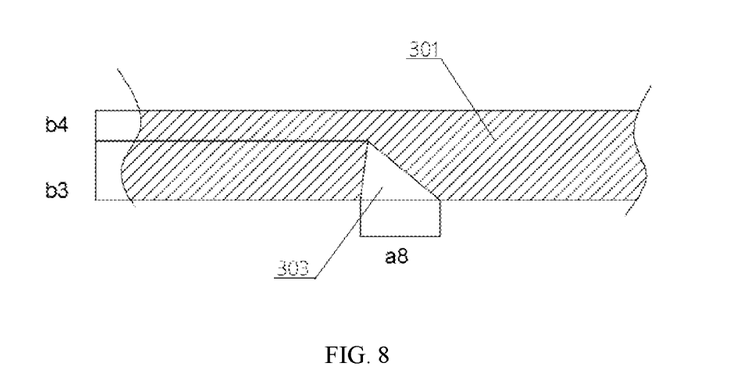
FIG. 8 is a partial cross-sectional diagram (2) of a circular bottom surface in the pressure vessel capable of releasing pressure according to an embodiment of the present invention.
Figure 9:
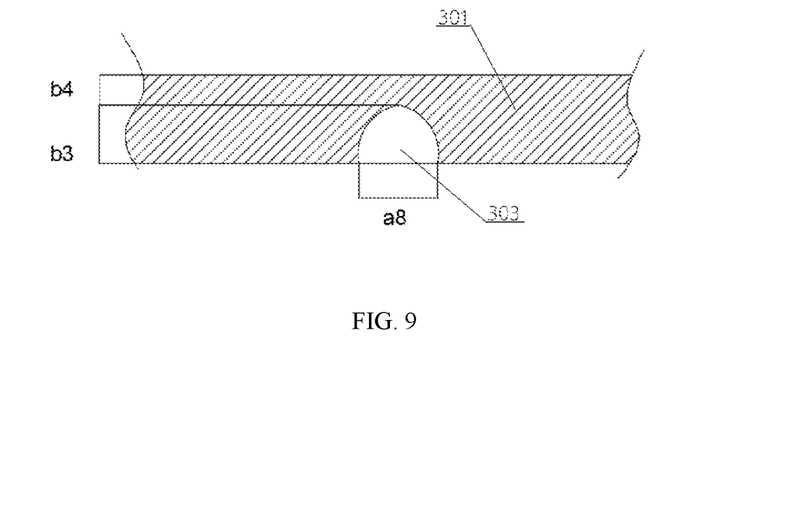
FIG. 9 is a partial cross-sectional diagram (3) of a circular bottom surface in the pressure vessel capable of releasing pressure according to an embodiment of the present invention.
Figure 10:
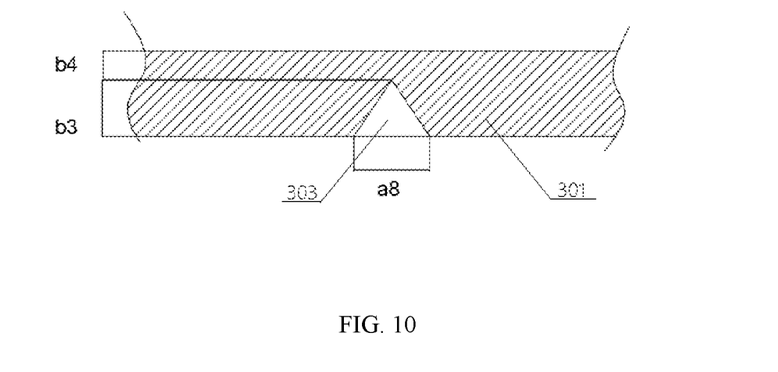
FIG. 10 is a partial cross-sectional diagram (4) of a circular bottom surface in the pressure vessel capable of releasing pressure according to an embodiment of the present invention.

Alternatively, as shown in FIG. 8 and FIG. 9, a cross section of the pressure relief notch groove 303 is hook-shaped or U-shaped. As shown in FIG. 10, a cross section of the pressure relief notch groove has a special hook shape, namely, V shape.

Specifically, the dimensions of the pressure vessel in the embodiment of the present invention further satisfy:

$$\frac{b4}{b3 + b4} = \frac{b6}{a8};$$

The pressure relief notch groove 303 has a depth of b3, and a value range of b3 is [0.25 mm, 0.75 mm];

The circular bottom surface 301 at the pressure relief notch groove 303 has a thickness of b4, and a value range of b4 is [0.05 mm, 0.4 mm]; and for the circular bottom surface 301 having the same thickness, the larger the value of b4, the stronger the pressure bearing capacity of the pressure vessel.

As shown in FIG. 7 to FIG. 10, the opening of the pressure relief notch groove 303 has a width of a8, and a value range of a8 is [0.1 mm, 3 mm]. When the depth b3 of the pressure relief notch groove 303 and the thickness b4 of the circular bottom surface 301 at the pressure relief notch groove 303 are definite, the larger the value of a8, the lower the pressure bearing capacity of the pressure vessel. The value of a8 can also affect the pressure relief speed of the pressure vessel. For example, for two pressure vessels of the same dimensions, the wider the opening of the pressure relief notch groove 303, the faster the pressure relief. The bottom of the pressure relief notch groove 303 has a width of b6, and a value range of b6 is [0.1 mm, 1 mm].

In this embodiment, in the case that the cross section of the pressure relief notch groove 303 has a shape of an isosceles trapezoid, a ratio of the width a8 of the opening of the pressure relief notch groove 303 to the width b6 of the bottom of the groove is limited to be equal to a ratio of the thickness b4 of the circular bottom surface 301 at the pressure relief notch groove 303 to the thickness b2 of the circular bottom surface 301.

Specifically, the dimensions of the pressure vessel in the embodiment of the present invention satisfy:

$$k5 = [2, 5],$$

-continued $$k5 = \frac{a8}{b3};$$

The pressure relief notch groove has a depth of b3, and a value range of b3 is [0.25 mm, 0.75 mm];

The opening of the pressure relief notch groove has a width of a8, and a value range of a8 is [0.1 mm, 5 mm].

In the pressure vessel of this embodiment, the ratio of the width a8 of the opening to the depth b3 of the pressure relief notch groove 303 is within a definite range, and can reflect the pressure bearing capacity of the pressure vessel. For example, when the width a8 of the opening is the same, the smaller the value of the depth b3 of the pressure relief notch groove 303, the larger the value of k5, and the larger the pressure value of the pressure vessel.

Figure 11:
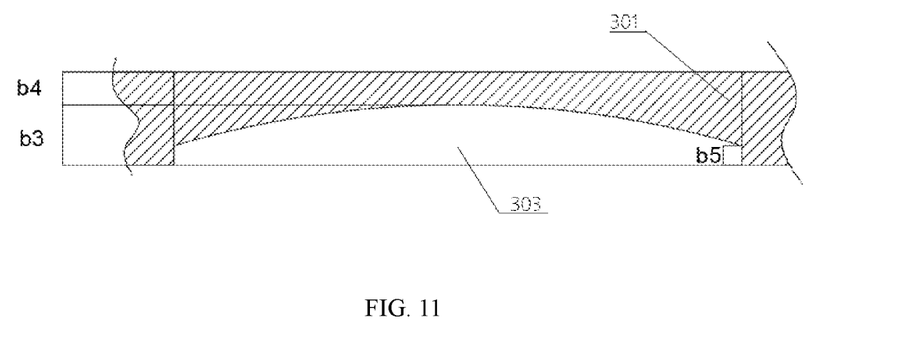
FIG. 11 is a partial cross-sectional diagram (5) of a circular bottom surface in the pressure vessel capable of releasing pressure according to an embodiment of the present invention.

Specifically, as shown in FIG. 11, the depth of the arc groove gradually increases from two ends to a midpoint, the two ends of the arc groove have a depth of b5, and a value range of b5 is [0.1 mm, 0.45 mm].

Figure 12:
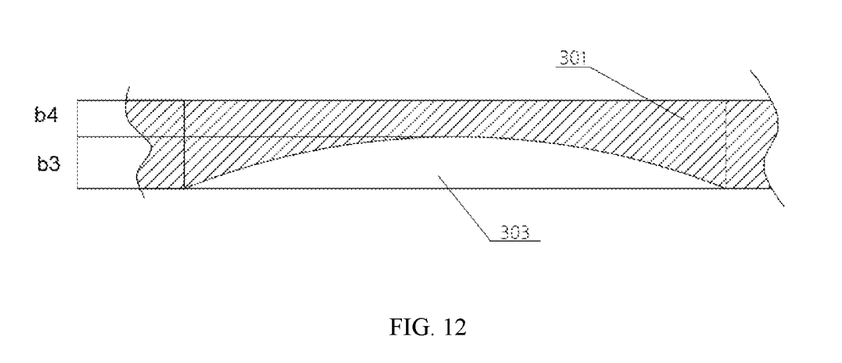
FIG. 12 is a partial cross-sectional diagram (6) of a circular bottom surface in the pressure vessel capable of releasing pressure according to an embodiment of the present invention.

In another embodiment, specifically, as shown in FIG. 12, the depth of the arc groove gradually increases from two ends to a midpoint, and the two ends of the arc groove have a depth of 0.

Figure 13:
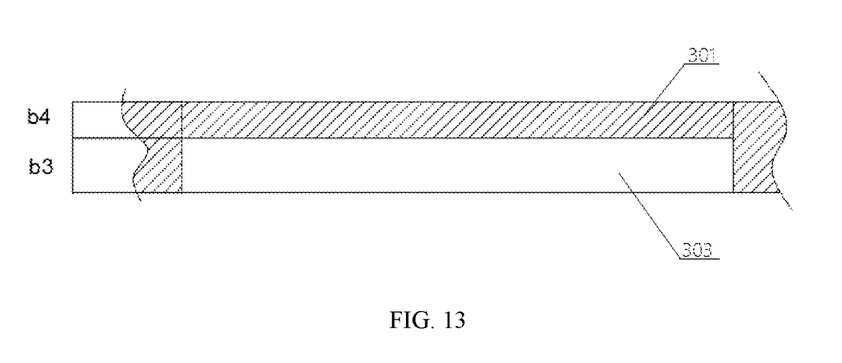
FIG. 13 is a partial cross-sectional diagram (7) of a circular bottom surface in the pressure vessel capable of releasing pressure according to an embodiment of the present invention.

In another embodiment, specifically, as shown in FIG. 13, the depth of the arc groove from two ends to a midpoint is consistent, and the value range of b3 is [0.3 mm, 0.6 mm].

Based on FIG. 11 to FIG. 13 conjunctively, when the pressure relief notch groove 303 in the embodiment of the present invention has other shapes, its depth can gradually increase or be consistent from the ends to the midpoint.

Specifically, the dimensions of the pressure vessel in the embodiment of the present invention further satisfy:

$$k6 = [2, 30],$$

and $$k6 = \frac{a1 + a2}{a6}.$$

A value of k6 indicates a relationship between the total height of the pressure vessel and the concave degree of the concave bottom 30. When the total height of the pressure vessel is definite, the larger the value of a6, the smaller the value of k6, and correspondingly, the larger the pressure value of the pressure vessel.

Based on all the above embodiments conjunctively, specific values of multiple groups of parameters are provided below as examples.

TABLE 1

| a1 | a2 | a3 | a4 | a5 | a6 | a7 |
|---|---|---|---|---|---|---|
| 5 mm | 65 mm | 15 mm | 30 mm | 35 mm | 4 mm | 7.5 mm |
| b1 | b2 | b3 | b4 | b5 | b6 | a8 |
| 0.18 mm | 0.3 mm | 0.25 mm | 0.05 mm | 0 mm | 0.1 mm | 0.6 mm |
| k1 | k2 | k3 | k4 | k5 | k6 | pressure |
| 2 | 2 | 0.5 | 13.6 | 2.4 | 17.5 | 8.4-10.9 bar |

TABLE 2

| a1 | a2 | a3 | a4 | a5 | a6 | a7 |
|---|---|---|---|---|---|---|
| 5 mm | 100 mm | 12 mm | 30 mm | 35 mm | 5 mm | 7.2 mm |
| b1 | b2 | b3 | b4 | b5 | b6 | a8 |
| 0.18 mm | 0.4 mm | 0.3 mm | 0.1 mm | 0.1 mm | 0.36 mm | 1.44 mm |
| k1 | k2 | k3 | k4 | k5 | k6 | pressure |
| 3 | 2.5 | 0.6 | 17.5 | 4.8 | 21 | 11.3-12.5 bar |

TABLE 3

| a1 | a2 | a3 | a4 | a5 | a6 | a7 |
|---|---|---|---|---|---|---|
| 5 mm | 150 mm | 11.25 mm | 33.75 mm | 38.75 mm | 20 mm | 7.875 mm |
| b1 | b2 | b3 | b4 | b5 | b6 | a8 |
| 0.2 mm | 0.3 mm | 0.25 mm | 0.05 mm | 0.1 mm | 0.2 mm | 1.2 mm |

TABLE 3-continued

| k1 | k2 | k3 | k4 | k5 | k6 | pressure |
|----|----|----|----|----|----|----------|
| 4 | 3 | 0.7 | 6.67 | 4.8 | 7.75 | 7.6-8.4 bar |

TABLE 4

| a1 | a2 | a3 | a4 | a5 | a6 | a7 |
|----|----|----|----|----|----|----|
| 5 mm | 200 mm | 14 mm | 35 mm | 41 mm | 10 mm | 10.5 mm |
| b1 | b2 | b3 | b4 | b5 | b6 | a8 |
| 0.2 mm | 0.5 mm | 0.3 mm | 0.2 mm | 0.1 mm | 0.5 mm | 1.25 mm |
| k1 | k2 | k3 | k4 | k5 | k6 | pressure |
| 5 | 2.5 | 0.75 | 17.15 | 4.17 | 20.5 | 9.0-10.1 bar |

TABLE 5

| a1 | a2 | a3 | a4 | a5 | a6 | a7 |
|----|----|----|----|----|----|----|
| 10 mm | 605 mm | 15 mm | 30 mm | 35 mm | 2.8 mm | 7.5 mm |
| b1 | b2 | b3 | b4 | b5 | b6 | a8 |
| 0.22 mm | 0.4 mm | 0.25 mm | 0.15 mm | 0 mm | 0.3 mm | 0.8 mm |
| k1 | k2 | k3 | k4 | k5 | k6 | pressure |
| 2 | 2 | 0.5 | 19.44 | 3.2 | 25 | 8.4-9.2 bar |

TABLE 6

| a1 | a2 | a3 | a4 | a5 | a6 | a7 |
|----|----|----|----|----|----|----|
| 10 mm | 110 mm | 17.5 mm | 35 mm | 40 mm | 5 mm | 9.625 mm |
| b1 | b2 | b3 | b4 | b5 | b6 | a8 |
| 0.22 mm | 0.5 mm | 0.3 mm | 0.2 mm | 0.2 mm | 0.3 mm | 0.75 mm |
| k1 | k2 | k3 | k4 | k5 | k6 | pressure |
| 3 | 2 | 0.55 | 18.29 | 2.5 | 24 | 10.1-11.1 bar |

TABLE 7

| a1 | a2 | a3 | a4 | a5 | a6 | a7 |
|----|----|----|----|----|----|----|
| 10 mm | 150 mm | 11.67 mm | 35 mm | 40 mm | 25 mm | 7 mm |
| b1 | b2 | b3 | b4 | b5 | b6 | a8 |
| 0.24 mm | 0.5 mm | 0.25 mm | 0.25 mm | 0.1 mm | 0.4 mm | 0.8 mm |
| k1 | k2 | k3 | k4 | k5 | k6 | pressure |
| 4 | 3 | 0.6 | 5.49 | 3.2 | 6.4 | 8.4-9.2 bar |

TABLE 8

| a1 | a2 | a3 | a4 | a5 | a6 | a7 |
|---|---|---|---|---|---|---|
| 10 mm | 200 mm | 9 mm | 36 mm | 42 mm | 15 mm | 6.3 mm |
| b1 | b2 | b3 | b4 | b5 | b6 | a8 |
| 0.24 mm | 0.6 mm | 0.4 mm | 0.2 mm | 0.2 mm | 0.4 mm | 1.2 mm |
| k1 | k2 | k3 | k4 | k5 | k6 | pressure |
| 5 | 4 | 0.7 | 13.07 | 3 | 14 | 12.7-13.5 bar |

TABLE 9

| a1 | a2 | a3 | a4 | a5 | a6 | a7 |
|---|---|---|---|---|---|---|
| 20 mm | 50 mm | 12 mm | 30 mm | 35 mm | 8 mm | 8.4 mm |
| b1 | b2 | b3 | b4 | b5 | b6 | a8 |
| 0.26 mm | 0.6 mm | 0.3 mm | 0.3 mm | 0 mm | 0.75 mm | 1.5 mm |
| k1 | k2 | k3 | k4 | k5 | k6 | pressure |
| 2 | 2.5 | 0.7 | 7.29 | 5 | 8.75 | 8.0-10.1 bar |

TABLE 10

| a1 | a2 | a3 | a4 | a5 | a6 | a7 |
|---|---|---|---|---|---|---|
| 20 mm | 150 mm | 8.75 mm | 35 mm | 40 mm | 12 mm | 5.25 mm |
| b1 | b2 | b3 | b4 | b5 | b6 | a8 |
| 0.26 mm | 0.7 mm | 0.4 mm | 0.3 mm | 0.2 mm | 0.8 mm | 1.87 mm |
| k1 | k2 | k3 | k4 | k5 | k6 | pressure |
| 4.25 | 4 | 0.6 | 12.95 | 4.67 | 14.17 | 9.9-13.5 bar |

TABLE 11

| a1 | a2 | a3 | a4 | a5 | a6 | a7 |
|---|---|---|---|---|---|---|
| 20 mm | 200 mm | 25 mm | 100 mm | 110 mm | 16 mm | 15 mm |
| b1 | b2 | b3 | b4 | b5 | b6 | a8 |
| 0.28 mm | 0.6 mm | 0.35 mm | 0.25 mm | 0.15 mm | 0.5 mm | 1.2 mm |
| k1 | k2 | k3 | k4 | k5 | k6 | pressure |
| 2 | 4 | 0.6 | 12.1 | 3.43 | 13.75 | 10.9-11.8 bar |

TABLE 12

| a1 | a2 | a3 | a4 | a5 | a6 | a7 |
|---|---|---|---|---|---|---|
| 20 mm | 240 mm | 40 mm | 120 mm | 130 mm | 18 mm | 20 mm |
| b1 | b2 | b3 | b4 | b5 | b6 | a8 |
| 0.28 mm | 0.5 mm | 0.3 mm | 0.2 mm | 0.1 mm | 0.6 mm | 1.5 mm |
| k1 | k2 | k3 | k4 | k5 | k6 | pressure |
| 2 | 3 | 0.5 | 11.74 | 5 | 14.44 | 8.0-10.1 bar |

TABLE 13

| a1 | a2 | a3 | a4 | a5 | a6 | a7 |
|---|---|---|---|---|---|---|
| 30 mm | 50 mm | 17.5 mm | 35 mm | 40 mm | 15 mm | 10.5 mm |
| b1 | b2 | b3 | b4 | b5 | b6 | a8 |
| 0.3 mm | 0.3 mm | 0.25 mm | 0.05 mm | 0 mm | 0.2 mm | 1.2 mm |
| k1 | k2 | k3 | k4 | k5 | k6 | pressure |
| 2 | 2 | 0.6 | 4.06 | 4.8 | 5.33 | 7.6-8.4 bar |

TABLE 14

| a1 | a2 | a3 | a4 | a5 | a6 | a7 |
|---|---|---|---|---|---|---|
| 30 mm | 180 mm | 15 mm | 60 mm | 70 mm | 30 mm | 7.5 mm |
| b1 | b2 | b3 | b4 | b5 | b6 | a8 |
| 0.3 mm | 0.6 mm | 0.35 mm | 0.25 mm | 0.15 mm | 0.6 mm | 1.44 mm |
| k1 | k2 | k3 | k4 | k5 | k6 | pressure |
| 3 | 4 | 0.5 | 6.53 | 4.11 | 7 | 9.9-11.8 bar |

TABLE 15

| a1 | a2 | a3 | a4 | a5 | a6 | a7 |
|---|---|---|---|---|---|---|
| 30 mm | 240 mm | 40 mm | 80 mm | 90 mm | 22 mm | 22 mm |
| b1 | b2 | b3 | b4 | b5 | b6 | a8 |
| 0.32 mm | 0.5 mm | 0.3 mm | 0.2 mm | 0.1 mm | 0.5 mm | 1.25 mm |
| k1 | k2 | k3 | k4 | k5 | k6 | pressure |
| 3 | 2 | 0.55 | 9.2 | 4.17 | 12.27 | 9.1-10.1 bar |

TABLE 16

| a1 | a2 | a3 | a4 | a5 | a6 | a7 |
|---|---|---|---|---|---|---|
| 30 mm | 300 mm | 30 mm | 60 mm | 66 mm | 24 mm | 21 mm |
| b1 | b2 | b3 | b4 | b5 | b6 | a8 |
| 0.32 mm | 0.8 mm | 0.5 mm | 0.3 mm | 0.1 mm | 0.8 mm | 2.13 mm |
| k1 | k2 | k3 | k4 | k5 | k6 | pressure |
| 5 | 2 | 0.7 | 10.08 | 4.27 | 13.75 | 12.1-16.8 bar |

TABLE 17

| a1 | a2 | a3 | a4 | a5 | a6 | a7 |
|---|---|---|---|---|---|---|
| 40 mm | 50 mm | 10 mm | 40 mm | 45 mm | 20 mm | 7.5 mm |
| b1 | b2 | b3 | b4 | b5 | b6 | a8 |
| 0.36 mm | 0.6 mm | 0.4 mm | 0.2 mm | 0.2 mm | 0.6 mm | 1.8 mm |
| k1 | k2 | k3 | k4 | k5 | k6 | pressure |
| 2 | 4 | 0.75 | 4.05 | 4.5 | 4.5 | 10.2-13.5 bar |

TABLE 18

| a1 | a2 | a3 | a4 | a5 | a6 | a7 |
|---|---|---|---|---|---|---|
| 40 mm | 180 mm | 50 mm | 100 mm | 110 mm | 30 mm | 25 mm |
| b1 | b2 | b3 | b4 | b5 | b6 | a8 |
| 0.6 mm | 0.7 mm | 0.5 mm | 0.2 mm | 0 mm | 0.7 mm | 2.45 mm |
| k1 | k2 | k3 | k4 | k5 | k6 | pressure |
| 2 | 2 | 0.5 | 5.38 | 4.9 | 7.33 | 10.7-16.8 bar |

TABLE 19

| a1 | a2 | a3 | a4 | a5 | a6 | a7 |
|---|---|---|---|---|---|---|
| 40 mm | 240 mm | 20 mm | 60 mm | 70 mm | 20 mm | 11 mm |
| b1 | b2 | b3 | b4 | b5 | b6 | a8 |
| 0.8 mm | 0.6 mm | 0.55 mm | 0.05 mm | 0.2 mm | 0.2 mm | 2.4 mm |
| k1 | k2 | k3 | k4 | k5 | k6 | pressure |
| 4 | 3 | 0.55 | 12.25 | 4.36 | 14 | 12.6-18.5 bar |

TABLE 20

| a1 | a2 | a3 | a4 | a5 | a6 | a7 |
|---|---|---|---|---|---|---|
| 40 mm | 300 mm | 15 mm | 60 mm | 68 mm | 30 mm | 9 mm |
| b1 | b2 | b3 | b4 | b5 | b6 | a8 |
| 0.38 mm | 0.8 mm | 0.75 mm | 0.05 mm | 0.45 mm | 0.15 mm | 2.4 mm |
| k1 | k2 | k3 | k4 | k5 | k6 | pressure |
| 5 | 4 | 0.6 | 10.28 | 3.2 | 11.33 | 19.4-25.3 bar |

Those skilled in the art can directly produce products of corresponding dimensions based on the numerical relationships disclosed in the present invention, without further sampling and testing, thereby greatly reducing product experiment costs. For materials of the product, those skilled in the art can perform production through existing materials on the market, such as deformable metal plates, and by coating the surface of the product with a corrosion-resistant paint to avoid corrosion of the vessel wall by a medium filled inside.

The embodiments of the present invention mainly research the dimensional relationships of the pressure vessel, and omit the specific production process, pressure relief process, and the like of the pressure vessel, those skilled in the art can directly understand the omissions from existing technologies.

The pressure vessel capable of releasing pressure according to the embodiment of the present invention includes a dome portion and a side wall portion connected into a whole from top to bottom, and a concave bottom in seaming connection with a bottom of the side wall portion, where a pressure release port is provided at a top of the dome portion; the side wall portion is cylindrical; a lower edge of the side wall portion is tightly attached to an outer edge of the concave bottom, and the both are curled outward and hermetically connected; the concave bottom includes a circular bottom surface in the center and an inclined connecting surface, and a pressure relief notch groove is provided on an outer side of the circular bottom surface; dimensions of the dome portion, the side wall portion, the circular bottom surface, the inclined connecting surface, and the pressure relief notch groove satisfy specific proportional relationships, so that the pressure vessel obtained by selecting dimensional values of all portions within limited ranges can have better safety; and those skilled in the art can directly select the dimensional values of the pressure vessel according to the limitations of the present invention, without excessive sampling and testing, thereby greatly reducing product experiment costs.

The present invention is further described above by virtue of specific embodiments, but it should be appreciated that the specific description here should not be understood as limitations to the essence and scope of the present invention. Various modifications made to the above embodiments by those of ordinary skill in the art after reading the description shall fall within the protection scope of the present invention.

The invention claimed is:

1. A pressure vessel capable of releasing pressure, wherein the pressure vessel comprises a dome portion and a side wall portion connected with the dome portion, and a concave bottom in seaming connection with a bottom of the side wall portion; a pressure release port is provided at a top of the dome portion; the side wall portion is cylindrical; a lower edge of the side wall portion is tightly attached to an outer edge of the concave bottom, and they both are curled outward and hermetically connected; the concave bottom comprises a circular bottom surface in the center and an inclined connecting surface, and a pressure relief notch groove is provided on an outer side of the circular bottom surface;

dimensions of the pressure vessel satisfy: k1=[2, 5], k2=[2, 4], k3=[0.5, 0.75], k4=[4, 20];

$$k1 = \frac{a1+a2}{a5}; k2 = \frac{a4}{a3}; k3 = \frac{a7}{a3}; k4 = \frac{(a1+a2)*a5}{(a3+a4)*a6};$$

the dome portion has a height of a1, and a value range of a1 is [5 mm, 40 mm];

the side wall portion has a height of a2, and a value range of a2 is [50 mm, 300 mm];

the circular bottom surface has a diameter of a3, and a value range of a3 is [3 mm, 60 mm];

the inclined connecting surface has a maximum diameter of a4, and a value range of a4 is [30 mm, 125 mm];

the side wall portion has a diameter of a5, and a value range of a5 is [35 mm, 130 mm];

a distance between the circular bottom surface and a bottommost surface of the pressure vessel is a6, and a value range of a6 is [2 mm, 30 mm];

the pressure relief notch groove has a total length of a7, and a value range of a7 is [1.5 mm, 45 mm];

the side wall portion has a thickness of b1, and a value range of b1 is [0.18 mm, 0.38 mm]; and the concave bottom has a thickness of b2, and a value range of b2 is [0.3 mm, 0.8 mm].

2. The pressure vessel capable of releasing pressure according to claim 1, wherein the pressure relief notch groove is a straight groove, an arc groove, an X-shaped groove, or a2 V-shaped groove.

3. The pressure vessel capable of releasing pressure according to claim 2, wherein an angle range of a corresponding central angle θ for the arc groove is θ=[10°, 180°], and a value range of a corresponding radius R for the arc groove is R=[0.5 mm, 5 mm].

4. The pressure vessel capable of releasing pressure according to claim 2, wherein a cross section of the pressure relief notch groove has a shape of an isosceles trapezoid, and a width of the pressure relief notch groove gradually decreases from an opening to a bottom.

5. The pressure vessel capable of releasing pressure according to claim 2, wherein the cross section of the pressure relief notch groove is hook-shaped or U-shaped.

6. The pressure vessel capable of releasing pressure according to claim 4, wherein the dimensions of the pressure vessel satisfy:

$$\frac{b4}{b3+b4} = \frac{b6}{a8},$$

the pressure relief notch groove has a midpoint depth of b3, and a value range of b3 is [0.25 mm, 0.75 mm]; the circular bottom surface at the pressure relief notch groove has a thickness of b4, and a value range of b4 is [0.05 mm, 0.4 mm]; the opening of the pressure relief notch groove has a width of a8, and a value range of a8 is [0.1 mm, 3 mm]; and the bottom of the pressure relief notch groove has a width of b6, and a value range of b6 is [0.1 mm, 1 mm].

7. The pressure vessel capable of releasing pressure according to claim 5, wherein the dimensions of the pressure vessel satisfy:

$$k5 = [2, 5],$$

and $$k5 = \frac{a8}{b3};$$

the pressure relief notch groove has a midpoint depth of b3, and a value range of b3 is [0.25 mm, 0.75 mm]; and the opening of the pressure relief notch groove has a width of a8, and a value range of a8 is [0.1 mm, 5 mm].

8. The pressure vessel capable of releasing pressure according to claim 6, wherein the depth of the arc groove gradually increases from two ends to a midpoint, the two ends of the arc groove have a depth of b5, and a value range of b5 is [0.1 mm, 0.45 mm].

9. The pressure vessel capable of releasing pressure according to claim 7, wherein the depth of the arc groove gradually increases from two ends to a midpoint, the two ends of the arc groove have a depth of b5, and a value range of b5 is [0.1 mm, 0.45 mm].

10. The pressure vessel capable of releasing pressure according to claim 6, wherein the depth of the arc groove from two ends to a midpoint is consistent, and the value range of b3 is [0.3 mm, 0.6 mm].

11. The pressure vessel capable of releasing pressure according to claim 7, wherein the depth of the arc groove from two ends to a midpoint is consistent, and the value range of b3 is [0.3 mm, 0.6 mm].

12. The pressure vessel capable of releasing pressure according to claim 1, wherein the dimensions of the pressure vessel satisfy:

$$k6 = [2, 30],$$

and $$k6 = \frac{a1 + a2}{a6}.$$

* * * * *